United States Patent [19]

Kobayashi et al.

[11] Patent Number: 4,576,672

[45] Date of Patent: Mar. 18, 1986

[54] APPARATUS FOR THE PRODUCTION OF REINFORCING NON-WOVEN FABRICS FOR COMPOSITES

[75] Inventors: Hiroyasu Kobayashi, Suita; Masayuki Fukui, Nishinomiya; Shosaku Nomoto, Kobe, all of Japan

[73] Assignee: Kurashiki Boseki Kabushiki Kaisha, Kurashiki, Japan

[21] Appl. No.: 482,975

[22] Filed: Apr. 7, 1983

[30] Foreign Application Priority Data

Apr. 12, 1982 [JP] Japan .................. 57-61280

[51] Int. Cl.⁴ .............................................. D04H 3/02
[52] U.S. Cl. ..................... 156/177; 156/439; 156/441; 156/555
[58] Field of Search ............... 156/177, 438, 440, 441, 156/181, 271, 267, 268, 270, 309.9, 322, 324, 555; 28/101

[56] References Cited

U.S. PATENT DOCUMENTS

| | | | |
|---|---|---|---|
| 3,041,230 | 6/1962 | Diehl | 156/439 |
| 3,496,053 | 2/1970 | Bascom et al. | 156/181 |
| 3,582,443 | 6/1971 | Bascom | 156/181 |
| 3,605,220 | 9/1971 | Atwood et al. | 156/440 |
| 3,649,411 | 3/1972 | Bolles | 156/440 |
| 3,855,036 | 12/1974 | Solbeck | 156/181 |
| 4,295,905 | 10/1981 | Bascom et al. | 156/181 |
| 4,460,633 | 7/1984 | Kobayashi et al. | 422/405 |

Primary Examiner—Michael Ball
Attorney, Agent, or Firm—Wenderoth, Lind & Ponack

[57] ABSTRACT

An apparatus for the production of reinforcement non-woven net fabric which is provided with selvage nipping devices for nipping selvages of a weft sheet constituted by loop end portions of reaches of weft thread on both sides of the weft sheet and advancing the weft sheet with the weft thread reaches laterally tensioned, an adhesive applying device for coating thermoplastic adhesive on the weft sheet being nipped by the selvage nipping devices except for the selvage portion of the weft sheet, a heating device for drying and melting the adhesive on the weft sheet, and a sheet pressing device for pressing and bonding to each other the weft sheet with melted adhesive thereon and a preheated warp sheet. During applying of the adhesive the weft thread reaches can be maintained exactly straight and in parallel and spaced relationship, and no adhesive is applied to most of the warp thread, other than at the intersection points with the weft sheet. Further, the sheet press device has a peripheral surface which is controlled so as to keep the temperature lower than softening point of the adhesive, whereby the composite of weft and warp sheets can be easily and rapidly released from the sheet pressing device.

7 Claims, 5 Drawing Figures

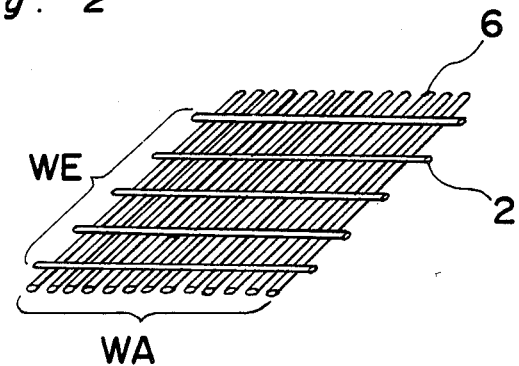
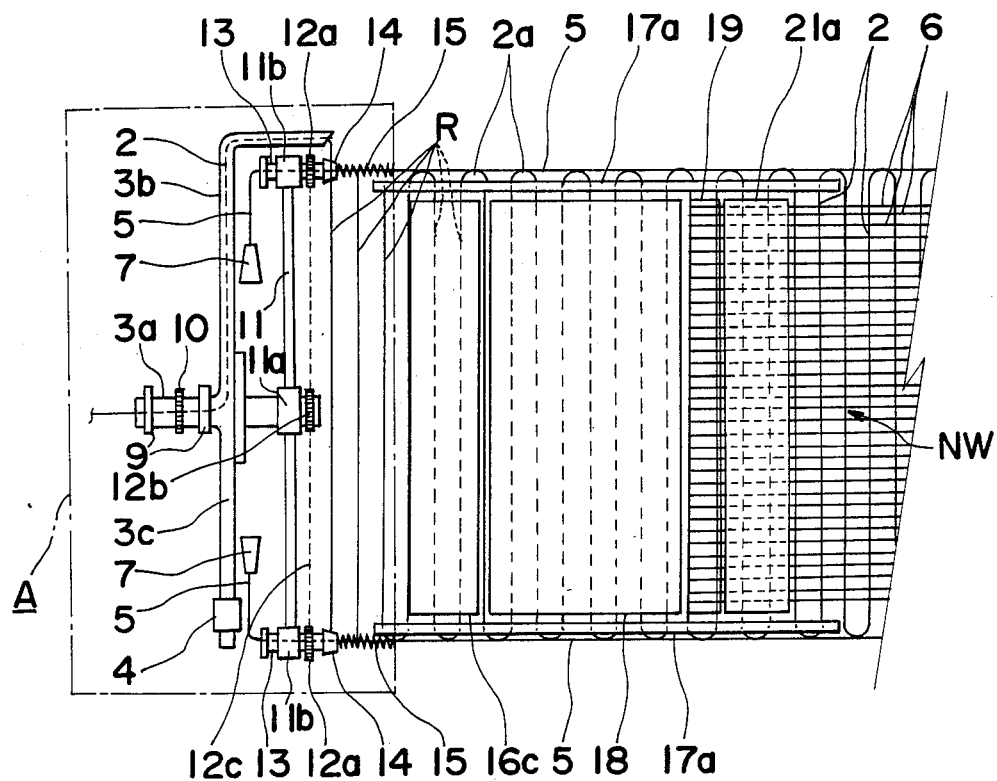

APPARATUS FOR THE PRODUCTION OF REINFORCING NON-WOVEN FABRICS FOR COMPOSITES

BACKGROUND OF THE INVENTION

The present invention relates generally to the production of reinforcing fabric, and more particularly to an improved apparatus for formation of non-woven net fabrics used as reinforcement for composite material which is composed of thermosetting resin reinforced by reinforcing fiber having high strength, rigidity and modulus, for example graphite fiber, aromatic polyamide fiber and the like.

The present inventors have previously proposed, as shown in FIG. 1, an invention relating to a reinforcing non-woven fabric suitable for use as reinforcement for composite material in Japanese patent applicaton Tokugansho No. 56-203870 (corresponding to U.S. patent application Ser. No. 449800 and EPC applicaton Ser. No. 82111583.9.)

According to the above invention, the non-woven fabric has three-layer structure comprising upper and lower warp sheets WA-I and WA-II, and a weft sheet WE sandwiched between the pair of warp sheets, and is formed by a method comprising a step of impregnating adhesive into the weft thread of the weft sheet WE and a step of respectively supplying the pair of warp sheets WA-I and WA-II to both sides of the weft sheet WE with no adhesive thereon and simultaneously pressing and bonding the sheets to each other at their intersection points to form a composite sheet of warp and weft sheets, i.e. a non-woven fabric. Accordingly, the adhesive is impregnated only in the weft threads and is present at the intersection points of the warp threads. Thus, when using said non-woven fabric as reinforcement for the resinous composites, the resin can readily and sufficiently permeate especially into the warp threads, resulting in a resinous composite having high strength.

In U.S. Pat. No. 3,728,195 there is disclosed an apparatus for production of reinforcing non-woven net fabrics in which a pair of warp sheets, and a weft sheet to be sandwiched between the warp sheets are initially brought together in co-planar relationship, and these sheets are subsequently dipped in an adhesive bath, and finally these sheets are dried so as to be bonded to each other.

The non-woven fabric formed by the conventional apparatus as described above, however, has some drawbacks. For instance, when using it as reinforcement for the resinous composites, the resin can not sufficiently permeate into either the warp or the weft threads since the adhesive has been previously coated on most of the peripheral surfaces of the threads, and thus sufficient reinforcing effect by the non-woven net fabric is not available. In addition, during passing of the composite of the warp and weft sheets through the adhesive bath, misplacement of the threads occurs. These threads should be arranged in parallel and equally spaced relationship in order to obtain high strength.

SUMMARY OF THE INVENTION

It is therefore an essential object of the present invention to provide an apparatus for production of non-woven fabrics for reinforcement of composite material which overcomes the problems as described above.

It is another object of the present invention to provide an apparatus of the type described above wherein the adhesion of the adhesive to sheet conveying means is avoided.

It is a further object of the present invention to provide an apparatus of the type described above which imposes on both the warp and weft threads a temperature condition suitable for bonding them to each other.

It is a still further object of the present invention to provide an apparatus of the type described above which has a simple construction, and is stable in operation and operates with high reliability.

In accomplishing these and other objects, according to the present invention, there is provided an apparatus for the production of reinforcing non-woven fabric which comprises selvage nipping means for nipping selvages of the weft sheet or the loop end portions of weft threads at both sides of the fabric, and for advancing the weft sheet, with the weft threads laterally tensioned, adhesive coating means for coating thermoplastic adhesive on the weft sheet being nipped by the selvage nipping device other than the selvage portions of the weft sheet, heating means for drying and melting the adhesive on the weft sheet, and a sheet pressing means for pressing and bonding to each other the weft sheet with melted adhesive thereon and the preheated warp sheet. Accordingly, during applying of the adhesive, the threads can be maintained exactly straight and in parallel and spaced relationship, and no adhesive is applied to the portion of the warp threads other than at the intersections with the threads of the weft sheet. Furthermore, the sheet press means has peripheral surfaces which are controlled so as to keep the temperature lower than the softening point of the adhesive, whereby the composite of weft and warp sheets can be readily and rapidly released from the sheet pressing means.

BRIEF DESCRIPTION OF THE DRAWINGS

These and other objects and features of the present invention will become apparent from the following description of the preferred embodiments thereof and with reference to the accompanying drawings, in which:

FIG. 2 is a fragmentary perspective view of a non-woven fabric to be formed by the apparatus according to the present invention;

FIG. 4 is a schematic top plan view of the apparatus of FIG. 3; and

Before the description of the present invention proceeds, it is to be noted that like parts are designated by like reference numerals and symbols throughout several views of the accompanying drawings.

DETAILED DESCRIPTION OF THE INVENTION

Referring to FIG. 2, the non-woven fabric for composite materials to be manufactured by an apparatus according to the present invention, is composed of a two-layer structure including a weft sheet WE and a warp sheet WA, the weft and warp threads 2 and 6 of which are bonded to each other at the intersection points thereof. The weft and warp threads 2 and 6 are composed of material suitable for reinforcement fabric such as graphite fiber and aramide fiber.

Figure 3:
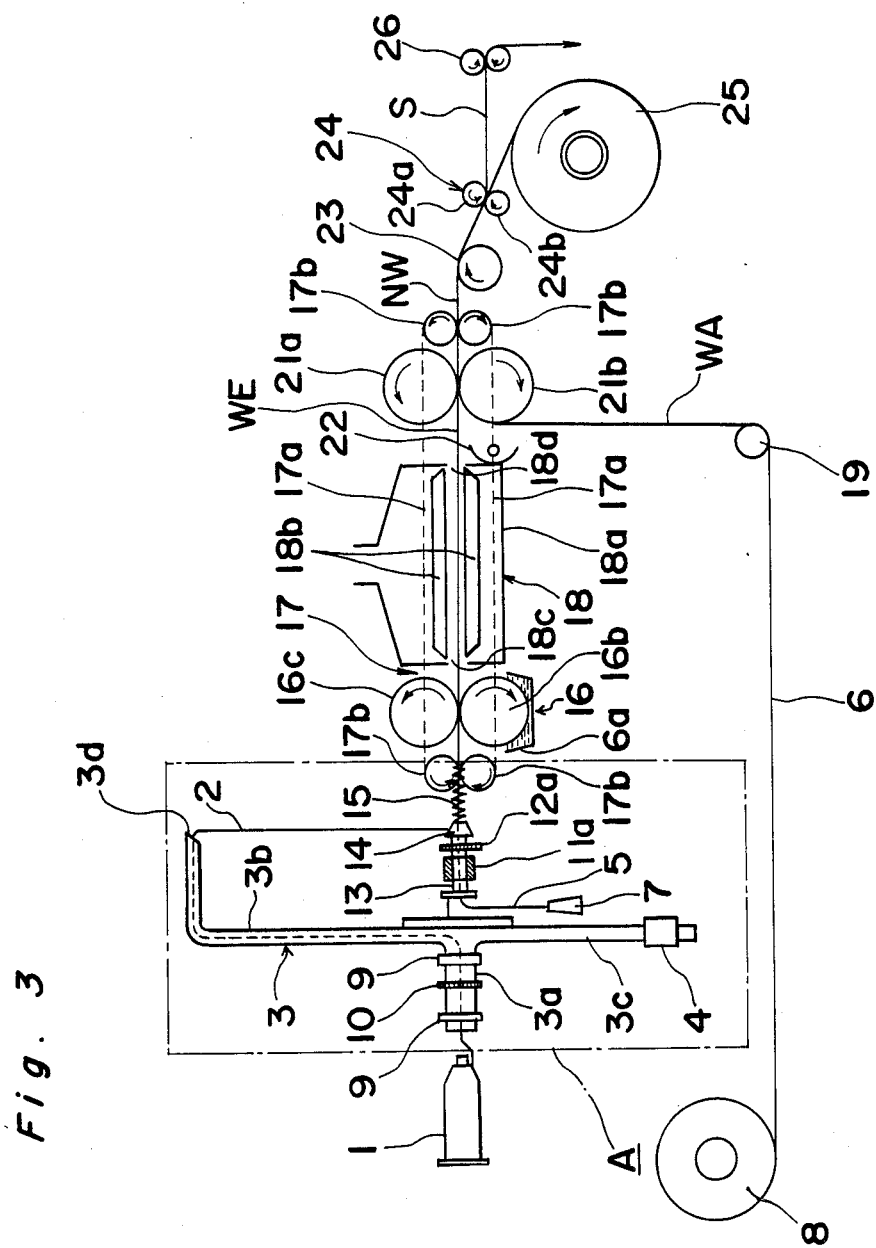
FIG. 3 is a schematic side elevational view of the apparatus according to the present invention.

Referring to FIGS. 3 and 4, the apparatus according to the present invention includes a weft bobbin 1 for supplying a continuous weft thread 2, a warp beam 8 for supplying a warp sheet WA or a plurality of warp threads 6 which are wound in parallel relationship to each other thereon and a pair of selvage bobbins 7 for respectively supplying a pair of selvage threads 5 along the opposite sides of the apparatus.

The apparatus comprises a weft sheet forming means A, generally surrounded by chain lines, which receives the weft thread 2 from the weft bobbin 1 and lays it in a continuous succession of reaches R of weft and sinding it about the pair of selvage threads 5 at the ends of the thread reaches R. The means A includes weft thread winding device 3 comprising a hollow central shaft portion 3a which rotates about a horizontal axis, a hollow tubular thread-guide arm 3b extending radially outwardly from the central shaft portion 3a and a balance arm 3c extending in a direction opposite to the thread-guide arm 3b and having, at its open end, a balance weight 4. The central shaft portion 3a is rotatably supported at its one end portion, by bearings 9, and is driven by a motor (not shown) which is drivingly connected via a chain (not shown) to a sprocket 10 mounted around the central shaft portion 3a. During rotation of the thread winding device 3, a weft thread 2 is continuously passed from the weft bobbin 1 through the central shaft portion 3a, radially outwardly through the hollow tubular arm 3b, and through a thread outlet 3d in its outer end. The central shaft portion 3a has a sprocket 12b at its end opposite to the thread supplying end. A pair of selvage thread supplying hollow members 13 are respectively rotatably supported by the ends 11b of a support arm 11 which is supported by a bearing 11a surrounding the central shaft portion 3a. Each hollow member 13 has a sprocket 12a therearound which is drivingly connected with the sprocket 12b on the central shaft portion 3a via a chain 12c, so that each hollow member 13 rotates with respect to the support arm 11 due to the rotation of the weft thread winding device 3. A helical spring 15 is secured to the forward end face of the each hollow member 13 via a hollow conical thread-guide 14 which is radially aligned with outlet 3d. The thread-guide 14 and the helical spring 15 rotate together with each member 13. The selvage thread 5 supplied from each selvage bobbin 7 passes through the hollow member 13, the hollow thread-guide 14 and the interior of the helical spring 15. The selvage threads 5 are each drawn by draw rolls 26 through selvage slitters 24.

During rotation of the weft thread winding device 3 in the means A, the weft thread 2 continuously advancing from the outlet 3d of the guide arm 3b engages the conical hollow thread-guides 14 once each half rotation thereof to form thread reaches R between the pair of thread-guides 14. Since the hollow guides 14 are of conical shape, loop ends 2a connecting the reaches R engage with the thread-guides 14 and slide down into the helical springs 15, and subsequently the reaches R advance to the open end of the helical spring 15 due to its rotation. The loop ends 2a between the reaches R engage the selvage threads 5 passing through the interior of the spring 15 and the rotation of the springs position the reaches R in uniformly spaced relationship between the pair of advancing selvage threads 5.

Since the selvage threads 15 are drawn by the draw rolls 26, as described above, the selvage threads 15 are held under tension so that the reaches R are horizontally held between the pair of the threads 15 with some degree of tension. The tension on the weft threads in the reaches, however, is not sufficient to prevent misplacement of the reaches of weft threads between the pair of selvage threads 5. Therefore, a pair of selvage nipping devices 17 is provided for supporting and conveying the loop ends 2a between the reaches R, i.e. the selvage of the weft sheet WE at both sides, while applying sufficient tension to the weft threads.

Each selvage nipping device 17 includes upper and lower endless belts 17a which extend along the corresponding selvage threads 5 from a position adjacent to the corresponding helical spring 15 to a position downstream of press rolls 21a and 21b (described hereafter), and are respectively arranged to be driven by a set of front and back drive rolls 17b. The loop ends 2a between the reaches R at each side advancing along the helical springs 15 are in turn nipped between the upper and lower belt 17b and forwardly conveyed. Needless to say, the speed of the belts 17b is the same as the advancing speed of the reaches R supplied from the means A.

Preferably, the endless belts 17b are composed of rubber material and also their nip faces have a wave-shape section, viewed along a line perpendicular to their advancing direction, in order to nip the selvage reliably. Accordingly, the reaches R leaving the helical springs 15 can be held straight and under sufficient tension between the pair of selvage nipping devices 17.

An adhesive applying device 16 and a heating device 18 are positioned in turn along the path of advance of the reaches R between the pair of selvage nipping devices 17.

The adhesive applying device 16 comprises an adhesive bath 6a for storage of adhesive which is arranged under the reaches R being conveyed by the pair of selvage nipping devices 17, a kiss roll 16b which is rotatably mounted such that its lower portion dips in the adhesive in the bath 16a, and a squeeze roll 16c which is rotatably arranged above the kiss roll 16b with a slight clearance therebetween, so that during passing of the reaches R between the both rolls 16b and 16c, the adhesive on the peripheral surface of the kiss roll 16b is applied onto the weft threads along the reaches, but not to the loop ends 2a nipped by the belts 17a.

The adhesive to be used in this apparatus is a thermoplastic adhesive, preferably a thermoplastic urethane type, thermoplastic polyester type or polyamide type, and for example "BOND CVC 33" (name used in trade and manufactured by KONISH Kabushiki Kaisha Japan)

The heat device 18 comprises a heat housing 18a having an inlet 18c and outlet 18d for allowing the reaches R of the weft threads forming the weft sheet WE to pass through the housing 18a, and upper and lower heaters 18b which are arranged in the housing 18a on both the upper and lower sides with respect to the passing reaches R, with a suitable space therebetween. Accordingly, during passing of the reaches R through the housing 18a, the adhesive on the reaches R is heated so that the solvent contained in the adhesive is vaporized, and the adhesive itself is melted. The reaches R leaving the outlet 18d of the housing 18a advance through the nip of press rolls 21a and 21b which are arranged between the heat housing 18a and the front rolls 17b of the selvage nipping devices 17.

The warp sheet WA or threads 6 supplied from the warp beam 8, as previously described, is applied to lower face of the reaches R at the nip portion of press rolls 21a and 21b via a groove roll 19 which positions the warp threads so that they reach the nip of the press roll 21a and 21b in exactly parallel and equally spaced relationship. A heat member 22 is positioned adjacent to the lower press roll 21b so as to heat one side of the warp threads 6 which is to come in contact with the thread reaches R, so that the warp threads 6 are heated to a temperature suitable for adhesion to the adhesive on the weft threads 2.

The warp and weft sheets WA and WE are brought into contiguous co-planar relationship at the nip portion of the press rolls 21a and 21b, and are bonded to each other at their intersection points by the adhesive on the weft thread 2 to form a composite of warp and weft sheets, namely a non-woven net fabric NW.

The press rolls 21a and 21b respectively have a release coating, for example, of teflon and silicone on the peripheral surface thereof and are also controlled such that the temperature of the peripheral surface thereof may can be kept at range lower, by 30° C. to 60° C., than the softening point of the adhesive (based on Ring and Ball method, ASTM, E 28-58T) so that the adhesive on the warp and weft sheets is cooled, and accordingly, the temperature thereof falls under the softening point as soon as the warp and weft sheets are bonded to each other, as a result of which the non-woven fabric NW is readily released from the press rolls 21a and 21b. In other words, the adhesive is not adhered to the rolls 21a and 21b. In addition, since the warp sheet WA has been heated by the heating member 22, as above described, the adhesive on the warp sheet WA readily and rapidly adheres to the weft threads 2 of the weft sheet WE.

It is to be noted that the temperature of the peripheral surface of the press rolls 21a and 21b should be kept relatively higher for the purpose of bonding the warp and weft sheets to each other, while the temperature should be kept relatively lower for preventing adhesion of the adhesive to the press rolls 21a and 21b, so that the temperature should be suitably set in said range as above described.

The non-woven fabric NW passing through the press rolls 21a and 21b is wound on a winding roll 25 through a roll 23. As previously described, a selvage slitter 24 is arranged on each side of the passing non-woven fabric NW between the guide roll 23 and the winding roll 25. Each slitter 24 comprises a set of upper and lower cutting rolls 24a and 24b which cut away the corresponding selvage portions between the fabric NW including the loop end portions of the reaches R and the selvage thread 5. Each selvage portion S cut away is wound up on the corresponding draw rolls 26.

According to the embodiment as above described, the adhesive is coated or impregnated on only the weft threads 2 and portions of the warp threads 6 intersecting the weft thread 2, but not on the remainder of the warp threads. Thus, when using the non-woven fabric manufactured by the apparatus above described as the reinforcement material for the resinous composites, the composite resin readily and sufficiently permeates into the portion of the warp threads having no adhesive, and thus, resinous composites having high strength can be obtained. Furthermore, since each warp thread 6 of the warp sheet WA is oriented in a straight position with no crimp, as compared with conventional woven net fabric, the resinous composite using the above non-woven net fabric NW has higher strength in the direction in which the warp threads extend.

Figure 1:
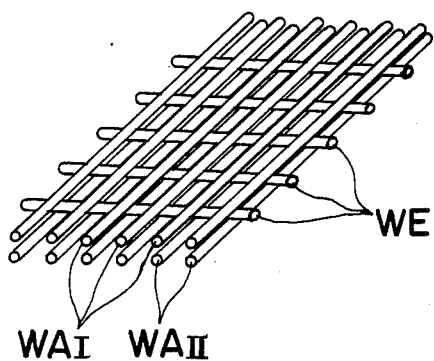
FIG. 1 is a fragmentary perspective view of a non-woven fabric according to the prior art, as previously described.
Figure 5:
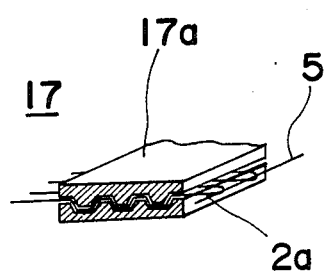
FIG. 5 is a sectional view of the endless belts of a selvage nipping device employed in the apparatus of FIGS. 3 and 4.

Although the present invention has been fully described by way of example with reference to the accompanying drawings, it is to be noted here that various changes and modifications will be apparent to those skilled in the art. For instance, when it is desired to manufacture the non-woven fabric shown in FIG. 1, means for supplying an upper warp sheet may be additionally provided. Such an upper warp sheet will be supplied between the pair of press rolls 21a and 21b so as to face the upper side of the weft sheet WE which is advancing from the heating device 18 to the press rolls 21a and 21b. Furthermore, if it is desired to use a plurality of weft threads, the number of the thread-guide arms 3b can be increased. According to such a construction, a corresponding number of weft bobbins are provided and a weft thread from each bobbin can be let to a corresponding thread-guide arm. In addition, there may be used a weft thread onto which the adhesive has been previously coated or permeated and dried or a weft thread including two kind of fibers, one of which melts during passing thereof through the heating means 18, so as to adhere to the warp threads 6 at the nip portion of the pressing rolls 21a and 21b. In the case of using such a weft thread, the adhesive appling device 16 shown in FIG. 3 will be unnecessary.

Therefore, unless otherwise such changes and modifications depart from the scope of the present invention, they should be construed as being included therein.

What is claimed is:

1. A process for producing non-woven fabric reinforcement for composite material, comprising:
   continuously supplying a pair of selvage threads in horizontally spaced parallel relationship;
   laying down a continuous weft thread in a succession of spaced transverse reaches joined by selvage loops around the pair of selvage threads to form a weft sheet;
   nipping the selvage loops and selvage threads on both sides of said weft sheet and for conveying said weft sheet in a horizontal plane while tensioning the weft thread reaches laterally of the weft sheet;
   applying thermoplastic adhesive to the portions of the weft threads other than the selvage loops on only the portions of the weft threads facing outwardly of said weft sheet on at least one side of said thread as said weft sheet is being conveyed by means positioned along said nipping and conveying means;
   drying and melting the adhesive on the weft threads by heating means positioned along said nipping and conveying means downstream of said adhesive applying means;
   continuously supplying a warp sheet to said at least one side of said weft sheet at a position downstream of said heating means;
   preheating the warp threads of said warp sheet immediately before their arrival at the weft sheet to a temperature sufficient for adhesion to the thermoplastic adhesive on the weft threads by means adjacent the point at which said warp sheet is supplied to said weft sheet;
   continuously pressing the weft and warp sheets together for bonding the weft and warp threads of the respective sheets at the points of intersection thereof to form the non-woven fabric, the pressing including controlling the temperature of the surfaces of the pressing on the warp and weft sheets being at a temperature lower than the softening point of the adhesive; and winding the non-woven fabric into a roll.

2. A process as claimed in claim 1 wherein said nipping is performed with two pairs of upper and lower endless belts, one on each side of the weft sheet and each having opposed runs for nipping the selvage loops therebetween.

3. A process as claimed in claim 2 wherein said endless belts each having a wave-shaped cross-section in a direction perpendicular to the length thereof.

4. A process as claimed in claim 1 wherein said nipping is performed with means extends from a position adjacent said selvage thread supplying means to a position adjacent said pressing means.

5. A process as claimed in claim 1 wherein said adhesive is applied by means comprises an adhesive bath, and a kiss roll and an opposed squeeze roll between which said weft sheet passes, said kiss roll having the lower portion thereof dipping into said bath.

6. A process as claimed in claim 1 wherein said pressing is performed by means comprising a pair of press rolls having means for keeping the temperature of the peripheral surfaces thereof in the range lower by 30°–60° C. than the softening temperature of the adhesive.

7. A process as claimed in claim 1 in which said preheating is performed by means positioned adjacent said pressing means and is a heater directed toward the side of the warp sheet which is to come into contact with the weft sheet.

* * * * *